June 19, 1956 J. W. BAUR ET AL 2,750,930
FLUID PRESSURE MOTOR DRIVEN PUMP AND VALVE CONTROL DEVICE THEREFOR
Filed Sept. 22, 1953 4 Sheets-Sheet 1

INVENTORS:
John W. Baur,
Otto G. Plos and
Stanley J. Simms
By:- Gary, Desmond and Parker Attys.

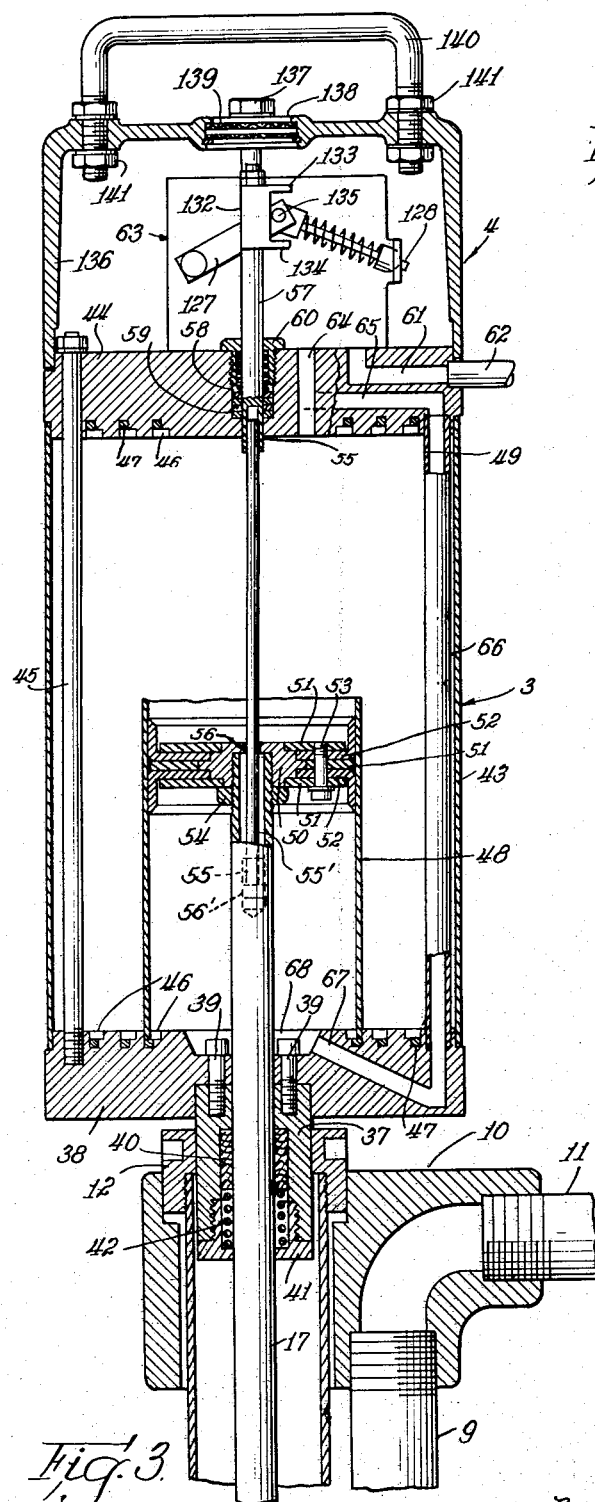
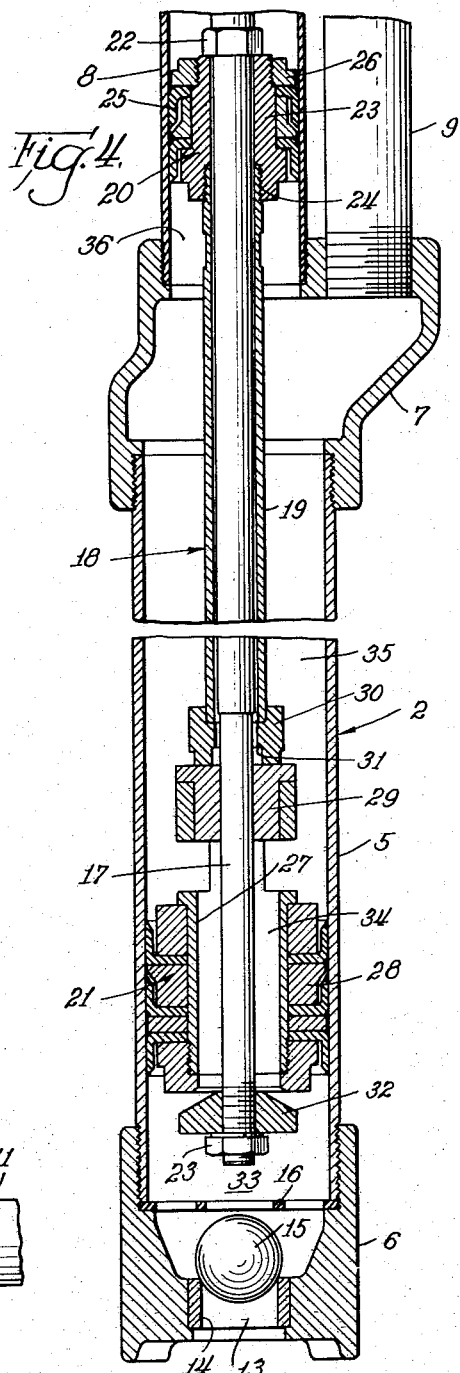

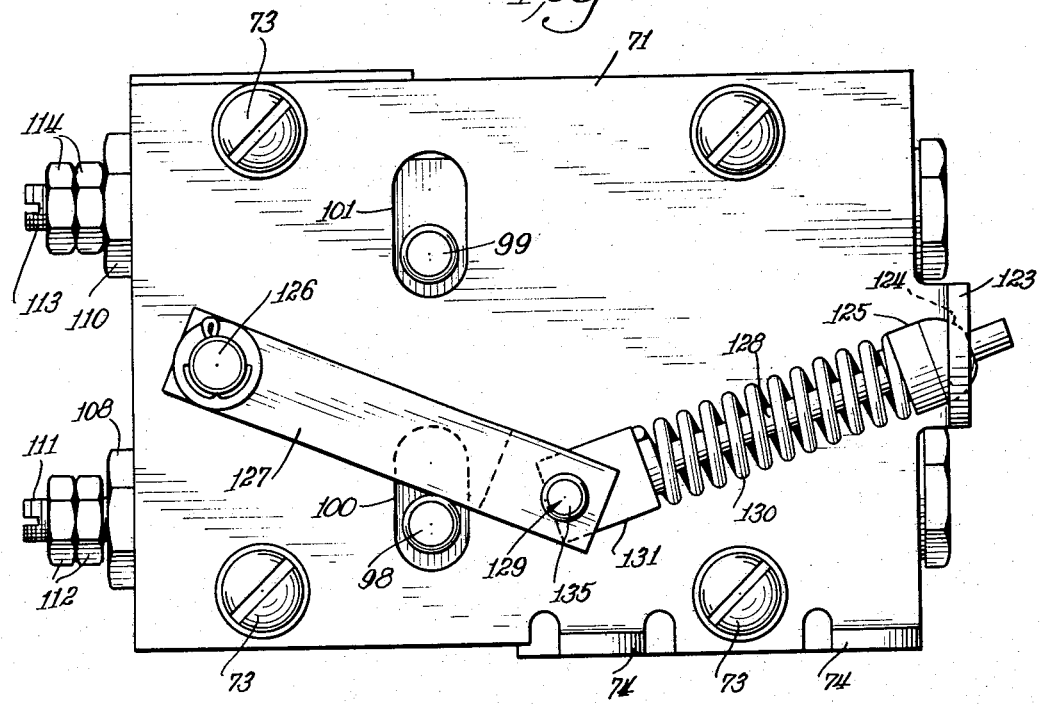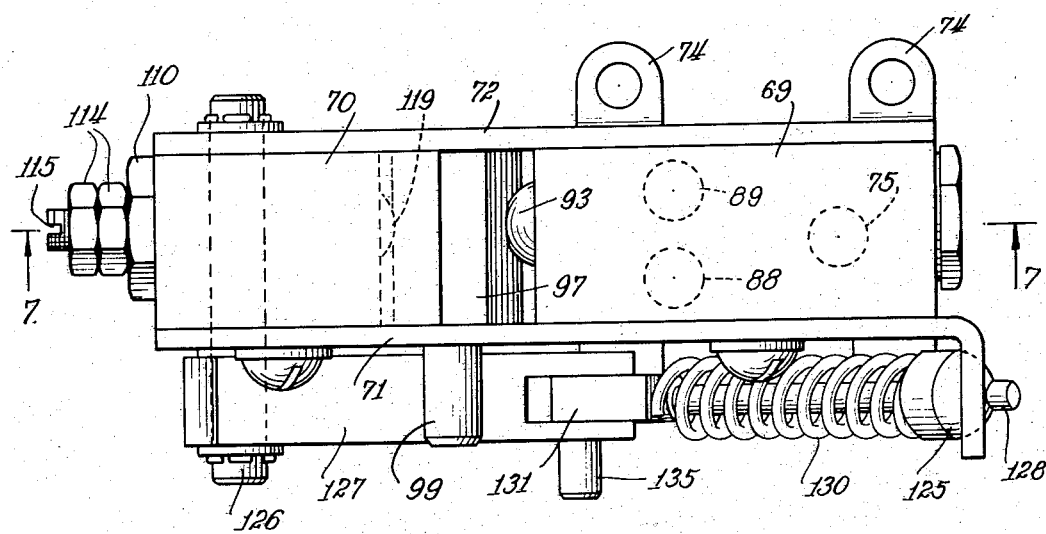

June 19, 1956  J. W. BAUR ET AL  2,750,930
FLUID PRESSURE MOTOR DRIVEN PUMP AND VALVE CONTROL DEVICE THEREFOR
Filed Sept. 22, 1953  4 Sheets-Sheet 4
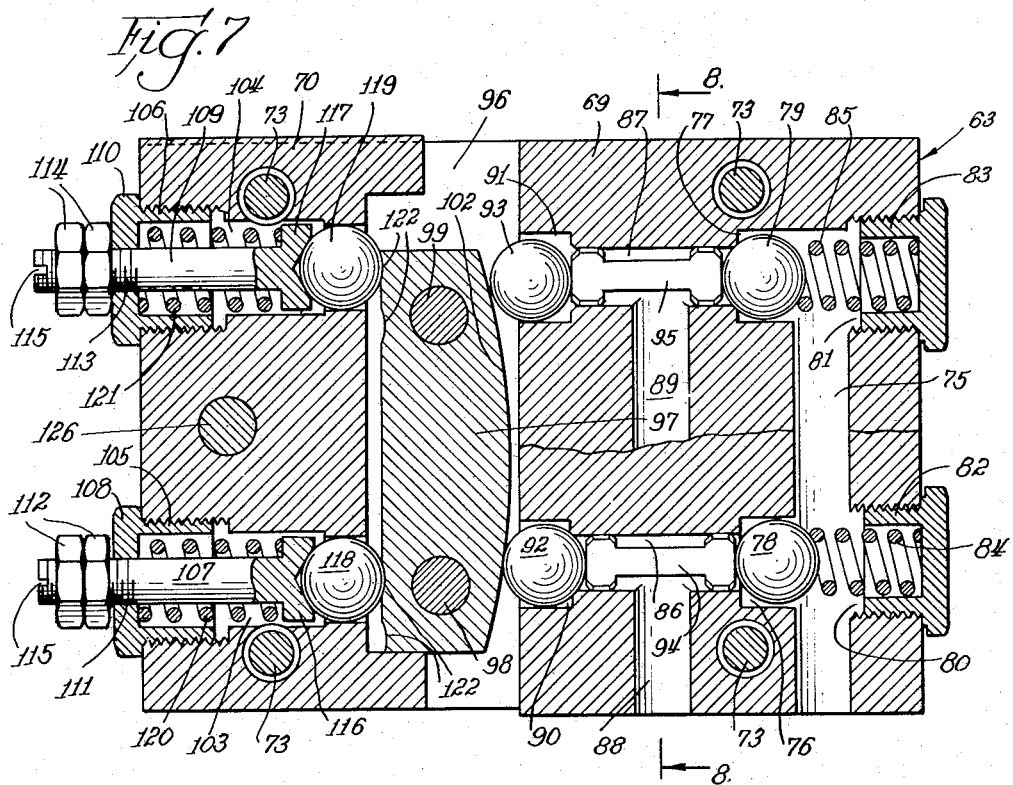
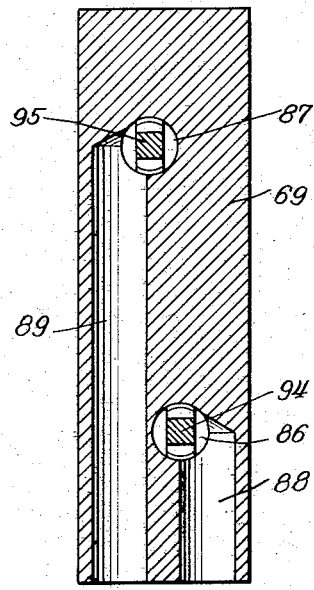
INVENTORS:
John W. Baur,
Otto G. Plos and
Stanley J. Simms
By: Gary, Desmond and Parker Attys United States Patent Office 2,750,930
Patented June 19, 1956

2,750,930

FLUID PRESSURE MOTOR DRIVEN PUMP AND VALVE CONTROL DEVICE THEREFOR

John W. Baur, Glenview, Otto G. Plos, Cicero, and Stanley J. Simms, Franklin Park, Ill., assignors to Binks Manufacturing Corporation, Chicago, Ill., a corporation of Delaware Application September 22, 1953, Serial No. 381,554

8 Claims. (Cl. 121—164)

This invention relates to improvements in a pump for pumping materials such as paint or the like and refers particularly to a fluid pressure actuated pump whose capacity may be varied at will.

One of the important aspects of the present invention resides in the provision of a valve mechanism for controlling the actuation of a fluid motor for driving the pump, said valve being so contrived and constructed that extremely critical control can be maintained over the pumping operation.

Another important feature of the invention resides in the provision of a fluid motor which may be controlled by the valve, hereinbefore described, the motor being of such construction that its capacity can be readily changed.

Other objects and advantages of the present invention will be apparent from the accompanying drawings and following detailed description.

In the drawings,

Fig. 3 is a detailed longitudinal sectional view of the motor for driving the pump.

Fig. 4 is a detailed longitudinal sectional view of the pumping mechanism.

Fig. 5 is an enlarged side elevational view of the valve for controlling the operation of the motor shown in Fig. 3.

Fig. 6 is a top plan view of the valve shown in Fig. 5.

Fig. 7 is a sectional view taken on line 7—7 of Fig. 6.

Fig. 8 is a transverse sectional view taken on line 8—8 of Fig. 7.

Figure 1:
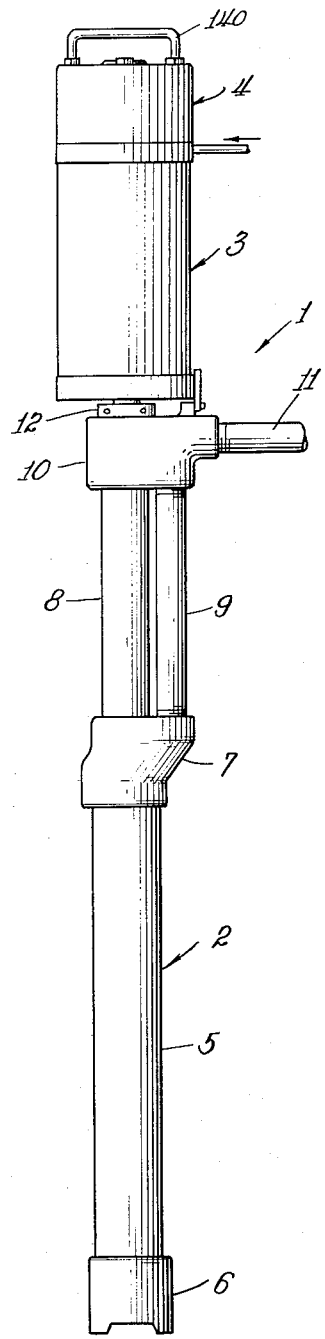
Fig. 1 is a side elevational view of the improved pump comprising the present invention.
Figure 2:
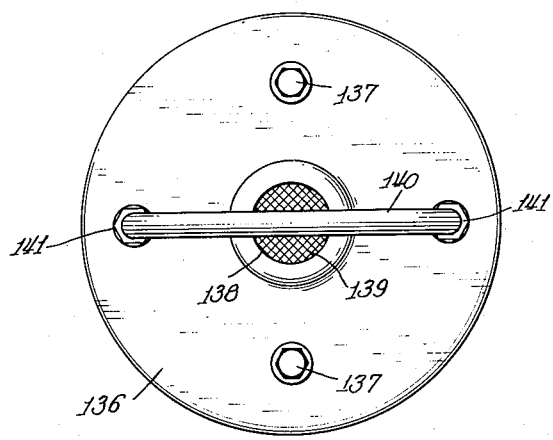
Fig. 2 is an enlarged top plan view of the pump shown in Fig. 1.

Referring in detail to the drawings, 1 indicates a pump of the type which may be immersed in a liquid or plastic material to be pumped. The pump, by virtue of its intended use is portable and comprises, a pump housing 2 which is adapted to be immersed in the material to be pumped; a motor housing 3 and a valve housing 4.

The pump housing 2 comprises a tubular cylinder 5 which at its lower end is threadedly connected to an intake cap 6. At the upper end of the cylinder 5, said cylinder is connected to a fitting 7, which, in turn, connects with a cylinder 8 of relatively reduced diameter and a discharge pipe 9. The upper ends of cylinder 8 and pipe 9 are connected to a fitting 10 which carries discharge pipe 11 which, in turn, connects with pipe 9 within the fitting and an adapter 12 which joins the fitting 10 to the lower portion of the motor housing 3.

The intake cap 6 is provided with an opening 13 at its lower end, said opening being defined by a tubular seat 14 constructed of steel or other hard metal. A ball 15 is adapted to seat upon the tubular seat 14 in the manner of the usual check valve, a foraminated disc 16 being confined between cap 6 and the lower end of cylinder 5 to function as a cage to prevent excessive movement of ball 15.

A piston rod 17 is reciprocably movable in the pump housing 2, said rod, at its upper end, extending into the motor housing 3 and being reciprocated by the motor contained therein, as will be hereinafter more fully described. A piston assembly 18 is carried upon said piston rod and comprises a tubular sleeve 19 which embraces an intermediate portion of the rod, and an upper and lower piston 20 and 21, respectively, which are carried by the rod 17. A nut 22 mounted upon the upper portion of the piston rod functions as an upper stop for the piston assembly 18 and a nut 23 threadedly mounted at the lower end of the rod functions as a lower stop for the lower protion of the assembly.

The upper piston 20 comprises a block 23 which is threadedly connected, as at 24, to the upper end of sleeve 19. Conventional packing rings 25 are carried by the block 23 and are confined on said block by collar 26 threadedly mounted upon the upper end of block 23. Thus, the upper piston 20 is movable with rod 17 within cylinder 8 in a substantially fluid-tight manner.

The lower piston 21 comprises a tubular member 27 which loosely circumscribes the piston rod, and conventional packing rings 28 are carried on the outer surface of the tubular member, the rings being in substantially fluid-tight relationship to the inner wall of the cylinder 5. The tubular member, at its upper end is carried by a spacer block 29 which is slidably positioned on rod 17, said spacer block, in turn, being in abutting relationship to a nut 30 which is threaded on shaft 17. The rod 17 is of reduced diameter adjacent nut 30 whereby a shoulder 31 is provided upon which nut 30 seats. Thus the upper portion of the piston assembly 18 is rendered rigid between shoulder 31 and nut 22 whereas the lower portion of the piston assembly is movable between nut 30 and nut 23. A tapered valve 32 is carried upon piston rod 17 being threadedly connected to the rod above the lock nut 23.

The pump contained within the pump housing 2 is of the double acting type, that is, the pump functions to discharge liquid through the discharge pipe 11 when the piston rod moves upwardly and also when the piston rod moves downwardly. The operation of the pump is as follows:

When the piston rod moves upwardly, the rod moves a slight distance relative to the lower piston 21 until the valve 32 is seated at the lower end of the tubular member 27. Thus, the space 33, as the piston 21 moves upwardly is filled with the liquid adapted to be pumped, said liquid being drawn through the opening 13 in the inlet cap 6, ball 15 being displaced. After the piston rod completes its upward travel and descends, the ball 15 seats itself upon the tubular seat 14 and at the inception of the downward travel of the piston rod the lower piston 21 lags behind the movement of the rod until the spacer 29 abuts the lower end of the nut 30. In this position valve 32 is open and the liquid previously drawn into the space 33 is forced upwardly through the interior 34 of the tubular member 27 and into the space 35 above the lower piston 21. At a previous stroke of the piston rod the space 35 was filled and hence when the piston rod rose with the valve 32 in seated position the material confined in the space 35 moved upwardly into the interior 36 of cylinder 8 and into pipe 9. The portion of the material which moved into pipe 9 discharges through the discharge pipe 11. Thus, on the upward travel of the piston rod the lower piston 21 functions to discharge liquid through the discharge pipe 11. Hence, when the piston rod moves downwardly and the material entrapped in the space 33 is forced upwardly through the interior of the tubular member 27 and into space 35, the material which previously moved into the space 36 within cylinder 8 also moves into the space 35 and hence liquid is again positively forced upwardly through the pipe 9 and outwardly through the discharge pipe 11. In this fashion, it can readily be seen that a positive flow of the material is discharged from pipe 11 with both the upward and downward strokes of the piston rod 17.

It can readily be seen that the double acting operation of the pump is dependent upon a correlation of the displacements of cylinders 5 and 8 and the diameter of pipe 9, so that for a predetermined motor speed (that is, rate of reciprocation of rod 17) a predetermined volume of liquid at predetermined pressure will be discharged from the pump at each half stroke. Inasmuch as the capacity of the pump is dependent upon the diameters of cylinders 5 and 8, the pump capacity may be conveniently changed by changing these cylinders and the pistons therein. This change can be conveniently made by virtue of the manner in which the pump housing is connected to the motor housing 3, that is, a pump of different dimensions may be used merely by changing the size of the adapter 12.

The adapter 12 is mounted upon a packing housing 37 which is secured to bottom plate 38 of the motor housing 3 by means of screws 39. The packing housing 37 is adapted to carry packing material 40 which embraces rod 17 and a packing gland 41 carries a coil spring 42 which may adjustably pressurize the packing material.

The motor housing 3, in addition to the bottom plate 38, comprises a cylindrical outer wall 43 and a top plate 44 which is secured in spaced relationship to bottom plate 38 by tie-rods 45. The motor housing 3 can carry fluid pressure motors of three different capacities which may be used to reciprocate the piston rod 17.

The bottom plate 38 of the motor housing 3 may be provided with a plurality of concentric circular grooves 46, each groove having an offset portion 47 adapted for the reception of a packing ring. The upper plate is also provided with similar grooves 46 each having similar offset portions 47, the respective grooves in the top and bottom plates being in alignment. In any aligned pair of grooves 46, a cylinder wall 48 may be positioned.

Depending upon which cylinder wall 48 is used, a piston 49 will be reciprocably positioned therein. Of course, all pistons are identical except for their differences in diameter. Each piston 49 comprises a central hub portion 50 upon which is mounted a plurality of discs 51 between which packing discs 52 may be carried, the discs being secured together by rivets 53 or other suitable fasteners. The hub 50 is threadedly secured to the upper end of piston rod 17 and is locked in place by means of lock nut 54 threadedly connected to the threaded end of rod 17.

The rod 17 is provided with an elongated recess 55' adapted to receive a lost-motion connecting pin 55 which extends through aperture 56 in each threaded hub 50 and connects at its upper end to valve-actuating rod 57. At its lower end, the pin 55 carries a shouldered nut 56' which is adapted upon the downward stroke of the piston to contact the lower face of the hub 50 adjacent aperture 56. The valve-actuating rod 57 is reciprocably positioned in a packing recess 58 provided in the top plate 44 which is adapted to carry packing material 59 adjustably pressurized by packing gland 60, which, in turn, is threadedly positioned in plate 44.

The top plate 44 is provided with a bore 61 which connects, at one end, with fluid inlet pipe 62 and at the other, connects with valve control device 63. The top plate 44 is also provided with bore 64 which connects at one end to valve control device 63 and at the other end into the top portion of a motor cylinder 48. Plate 44 is also provided with a bore 65 which, at one end, connects with valve control device 63, and, at the other end to a pipe 66. Pipe 66 extends from top plate 44 to bottom plate 38 between the motor housing wall 43 and the cylinder wall 48. At the bottom plate, pipe 66 connects with bore 67 provided in said bottom plate. Bore 67 at its opposite end connects into a recess 68 provided in the upper face of the bottom plate, said recess opening within the cylinder defined by cylinder wall 48.

As will be hereinafter more fully described, fluid under pressure introduced through pipe 62 to the valve control device 63 is passed alternately to the upper and lower portions of a cylinder 48 through bore 64, or bore 65, pipe 66 and bore 67, respectively. In this fashion the piston rod 17 is reciprocated to drive the pump, hereinbefore described.

The valve control device 63 comprises a pair of spaced blocks 69 and 70 and a front face plate 71 and rear face plate 72. The face plates 71 and 72 are secured to the blocks 69 and 70 and to each other by means of screws 73 which pass through the opposite face plates and also through the respective blocks. Each of the face plates 71 and 72 carry at their lower edge apertured lugs 74 whereby the device 63 may be secured to the upper portion of the top plate 44 of the fluid motor hereinbefore described.

Block 69 is provided with a bore 75 which connects at one end with bore 61 in top plate 44. A side recess 76 is provided within the thickness of the block 69 and opens into bore 75. A similar side recess 77 is also provided within the thickness of the block and opens at the end portion of bore 75, the recesses 76 and 77 being spaced from each other. Each recess 76 and 77 is adapted to house a ball 78 and 79 respectively.

An opening 80 is provided in block 69 in substantial alignment with recess 76, said opening connecting with the bore 75. A similar opening 81 is also provided in the block 69 in substantial alignment with recess 77, said opening also connecting with bore 75. A gland 82 is threadedly positioned in opening 80 and a similar gland 83 is threadedly positioned in opening 81, gland 82 functioning to urge a coil spring 84 into contact with ball 78 and gland 83 functioning to urge coil spring 85 into contact with ball 79.

A transverse bore 86 is provided in block 69 and opens at one end into recess 76. A similar transverse bore 87 is also provided in block 69 and opens into recess 77. A connecting bore 88 provided in block 69 connects with an intermediate portion of transverse recess 86, one end of said bore connecting with bore 65 provided in the top plate 44 of the fluid pressure motor. A bore 89 connects into an intermediate portion of the transverse bore 87, bore 89 being connected at its opposite end to bore 64 provided in the top plate 44 of the fluid pressure motor.

Thus, bore 75 in block 69 constitutes the inlet bore whereas bores 88 and 89 constitute the outlet bores, said latter bores leading to the lower and the upper portions of the cylinder 48 constituting the fluid pressure motor. The spring pressed ball 78 serves as a check valve between the inlet bore 75 and the outlet bore 88 and the spring pressed ball 79 serves as a check valve between the inlet bore 75 and the outlet bore 89. As will be hereinafter more fully described, the ball check valves 78 and 79 are periodically seated and unseated to permit delivery of fluid under pressure to the opposite ends of the cylinder comprising the fluid pressure motor.

A recess 90 is provided in the block 69 and connects with an end of the transverse bore 86. A similar recess 91 is also provided in the block 69 and connects with the transverse bore 87. A ball 92 is adapted to be positioned in recess 90 and a ball 93 is similarly positioned in recess 91. A spacer member 94 is loosely positioned in the transverse recess 86 and a similar spacer member 95 is positioned in the transverse recess 87. In operation, the spacer members 94 and 95 tend to unseat balls 78 and 79 respectively when urged by balls 92 and 93 respectively.

A space 96 is provided between blocks 69 and 70 and an actuating member 97 is loosely positioned in said space. The actuating member carries spaced pins 98 and 99 which extend transversely through slots 100 and 101 provided in the front face plate 71. The actuating member 97 is provided with an arcuate face 102 which is adapted to make contact with the surfaces of the balls 92 and 93 which project from the recesses 90 and 91 respectively into the space 96. The operation is such that when the actuating member 97 is moved to its lowermost position it exerts pressure upon ball 92 and hence ball 92 presses against the spacer member 94 and unseats ball 78 against the compression of spring 84. When the actuating member 97 is moved to its uppermost position it exerts pressure against ball 93 and in similar fashion ball 79 is unseated. When ball 78 is unseated ball 79 is seated and conversely when ball 79 is unseated ball 78 will be seated. Thus, the movement of the actuating member 97 upwardly or downwardly functions to connect the inlet bore 75 to the outlet bores 89 and 88 respectively.

Block 70 is provided with a transverse bore 103 and said block is also provided with a similar transverse bore 104, said bores being spaced from each other. A threaded gland 105 is threadedly positioned in the outer end of bore 103 and a similar threaded gland 106 is threadedly connected in the outer end of bore 104. An adjusting rod 107 is positioned in the bore 103 and extends loosely through the head 108 of gland 105. A similar adjusting rod 109 is positioned in bore 104 and extends loosely through head 110 of gland 106. The outer end of adjusting rod 107 is provided with screw threads 111 exteriorly of the head 108 and lock nuts 112 are carried upon said screw threads. Similarly, adjusting rod 109 carries screw threads 113 and lock nuts 114 are threadedly engaged with said screw threads exteriorly of the head 110. Both adjusting rods 107 and 109 have slotted heads 115 whereby said rods may be adjusted. The inner end of adjusting rod 107 is provided with a recessed head 116 and the inner end of adjusting rod 109 is provided with a similar recessed head 117. A ball 118 is positioned in the end portion of the bore 103 and a ball 119 is positioned in the end of bore 104. A coil spring 120 embraces rod 107 and is confined between head 116 and the head 108 of the gland 105. A similar coil spring 121 is confined between head 117 and the head 110 of the gland 106.

The arrangement is such that ball 118 is confined between the control member 97 and the head 116 of adjusting rod 107 and ball 119 is confined between the control member 97 and the head 117 of the adjusting rod 109. It can readily be seen that the control member 97 is movable vertically, as viewed in Fig. 7, and by virtue of the fact that the pins 98 and 99 are loosely positioned in the slots 100 and 101 respectively, a degree of lateral movement of the control member 97 is permitted. It can also readily be seen that the lateral position of the arcuate surface 102 relative to the balls 92 and 93 is of importance in seating and unseating the balls 78 and 79. Hence, by the provision of the spring pressed adjusting rods 107 and 109 an extremely fine and flexible adjustment of the lateral position of the control member 97 is obtained.

At the extreme positions of vertical travel of the control member 97 detents or grooves 122 are provided in the face of the control member whereby the balls 118 and 119 may be seated in a substantially indexed fashion relative to the control member 97 at the extreme positions of travel of said control member.

Under normal operating conditions when the ball 78 is seated, that is, when there is no communication between the source of fluid pressure and the lower portion of the fluid pressure motor, the ball 92 will be unseated, that is, the lower portion of the cylinder will be vented to the space 96. Similarly, when the ball 79 is seated, and no communication exists between the source of fluid pressure and the upper portion of the fluid pressure motor, the ball 93 will be unseated and the upper portion of the fluid pressure motor will be vented to atmosphere. The adjustment of the adjusting rods 107 and 109 is such that when ball 92 is seated lock nuts 112 will be slightly spaced from the head 108 and ball 118 will be resiliently urged by coil spring 120 into contact with the control member 97 and hence ball 92 will be seated under resilient pressure. Similarly, when ball 93 is seated, lock nuts 114 will be slightly spaced from head 110 and ball 119 will be resiliently urged toward the control member 97. Hence, ball 93 will be seated under the resilient pressure of spring 121. When the control member 97 is at its extreme lower position there will be a degree of play between ball 119, control member 97 and ball 93 so that there will be no interference with the seating of ball 79. Similarly, when control member 97 is at its extreme upper position, there will be a degree of play between ball 118, control member 97 and ball 92 and, hence, ball 78 will be firmly seated under the influence of spring 84.

A lug 123 is mounted upon the face plate 71, said lug being provided with a recessed seat 124 for the reception of the hemispherical end of a collar 125. A pivot pin 126 extends outwardly from the face plate 71 and a lever 127 is pivotally connected at one end to the pivot pin 126. A rod 128 has an end portion slidably positioned in collar 125 and is pivotally connected, as at 129, to the free end of the lever 127, and a coil spring 130 embraces rod 128 and abuts at opposite ends against the collar 125 and a collar 131 rigidly connected to rod 128.

The rod extension 57 which is connected to the upper portion of the pin 55 carries a collar 132, said collar, in turn, carrying spaced lugs 133 and 134. At the pivotal connection 129 between lever 127 and rod 128 a pin 135 extends outwardly, said pin being position between the spaced lugs 133 and 134.

The arrangement is such that when the pump piston rod 17 reciprocates, that is, when it is actuated by the fluid pressure motor, the motor piston moves slidably relative to pin 55. Adjacent the lower portion of the piston travel pin 55 is moved downwardly. Adjacent the upper portion of travel of the piston, the piston contacts nut 57' and thus moves pin 65 upwardly. Thus the rod extension 57 reciprocates and pin 135 is contacted by either lug 133 or lug 134 depending upon the direction of motion of the rod extension 57. That is, lugs 133 and 134 are contacted adjacent the endmost portions of the piston stroke. Hence, lever 127 is swung about its pivotal support 126 and inasmuch as said lever is disposed between the pins 98 and 99 carried by the control member 97, one or the other of said pins will be moved vertically within the respective slots 100 and 101. It can readily be seen that the lever 127 and rod 129 comprises a spring balanced toggle joint and consequently, when the lever 127 is swung from an extreme position it will move relatively slowly until the dead-center position of the toggle arrangement is reached, at which time, the spring 130 will cause the lever 127 to move rapidly into contact with the opposite pin 98 or 99. Hence, the movement of the control member 97 will be relatively rapid and will occur after the toggle arrangement comprising lever 127 and rod 128 have passed their dead center position.

The housing 4 comprises an inverted cup-shaped member 136 which is secured to the upper plate 44 of the fluid motor housing 3 by means of bolt 137. The central portion of the cup-shaped member 136 is provided with an aperture 138 in which a plurality of screens 139 are positoned. A U-shaped handle 140 is secured to the upper portion of the cup-shaped member 136 by means of nuts 141 which engage the threaded ends of the handle. The cup-shaped member functions as a closure for the upper end of the pump and houses the valve control device 63. By the provision of the screened aperture 138, a vent for the discharge of the fluid motor is provided, the cup-shaped housing 136 tending to muffle the sound of the fluid motor discharge.

It is apparent that herein is contemplated a fluid motor operated immersion type pump, the capacity of which may be conveniently changed, both as to the pumping mechanism itself and as to the fluid pressure motor for operating the pumping mechanism, and one of the most important features of the invention resides in a valve control device for the fluid motor which offers accurate and positive control of the operation of the fluid motor. Many modifications of the present invention may be made by any one skilled in the art and, hence, it is not intended that the invention be limited to the precise details shown except as necessitated by the appended claims.

We claim as our invention:

1. A valve control device for a reciprocating fluid pressure motor which comprises, a body provided with an inlet bore for the reception of fluid under pressure and a pair of outlet bores for connection to opposite ends of a reciprocating fluid motor, a pair of spaced resiliently seated check valves for respectively controlling communication between said inlet bore and each of said outlet bores, control means slidably movable substantially parallel to said spaced check valves for unseating said respective check valves, means for sliding said movable control means in said parallel direction to alternately unseat said check valves in timed relationship with the reciprocation of said motor, said last-mentioned means comprising a spring-pressed toggle linkage swingable generally parallel to the direction of movement of said control means, and means carried by said linkage for connection with the reciprocating mechanism of said motor to swing said toggle linkage.

2. A valve control device as contemplated in claim 1 wherein said movable control means is resiliently urged laterally with respect to said slidable direction of movement.

3. A valve control device for a reciprocating fluid pressure motor which comprises, a body comprising a valve block and a spaced control block, said valve block being provided with an inlet bore for the reception of fluid under pressure and a pair of outlet bores for connection to opposite ends of a reciprocating fluid pressure motor, a pair of resiliently seated check valves for respectively controlling communication between the inlet bore and each of said outlet bores, means for unseating said check valves comprising a control member positioned between said blocks and movable to positions to alternately unseat said valves, means carried by said body for moving said control member alternately to said valve-unseating positions, said last-mentioned means comprising a spring-pressed toggle linkage, means carried by said linkage for connection with the reciprocating mechanism of said motor, and means carried by said control block for resiliently urging said control member to unseat one of said check valves when said control member is in valve-unseating position.

4. A valve control device for a reciprocating fluid pressure motor which comprises, a body comprising a valve block and a spaced control block, said valve block being provided with an inlet bore for the reception of fluid under pressure and a pair of outlet bores for connection to opposite ends of a reciprocating fluid pressure motor, a pair of resiliently seated check valves for respectively controlling communication between the inlet bore and each of said outlet bores, a pair of exhaust valves for controlling communication between said outlet bores and the atmosphere, means for unseating an exhaust valve when the check valve associated with the same outlet bore is seated, means for unseating the other check valve when the exhaust valve associated with the same outlet bore is seated, a control member positioned between said blocks and movable to operative positions alternately to seat one exhaust valve while permitting the other exhaust valve to unseat, and a spring-pressed toggle linkage for moving said control member to said alternate operative positions in timed relationship to the reciprocations of said motor.

5. A valve control device for a reciprocating fluid pressure motor which comprises, a valve body provided with an inlet bore for the reception of fluid under pressure, a pair of outlet bores for connection to opposite ends of a reciprocating fluid pressure motor, and an exhaust port, a double acting valve positioned in said body for reciprocally controlling connection between the inlet bore and one of said outlet bores and between the outlet bore and the exhaust, a second double acting valve spaced from said first mentioned valve for reciprocally controlling connection between the inlet bore and the other outlet bore and between said last mentioned outlet bore and the exhaust, a control member carried in said body and slidably movable between two limiting positions adjacent said spaced valves, resilient means for urging said control member laterally toward said valves, said control member having a substantially wedge shaped cam surface for contacting and moving one of said valves at each limiting position, and a spring pressed toggle linkage for moving said control member alternately to said limiting positions in timed relationship to the reciprocations of said motor.

6. A valve control device for a reciprocating fluid pressure motor which comprises, a valve body provided with an inlet bore for the reception of fluid under pressure, a pair of outlet bores for connection to opposite ends of a reciprocating fluid pressure motor, and an exhaust port, a double acting valve positioned in said body for reciprocally controlling connection between the inlet bore and one of said outlet bores and between the outlet bore and the exhaust, a second double acting valve spaced from said first mentioned valve for reciprocally controlling connection between the inlet bore and the other outlet bore and between said last mentioned outlet bore and the exhaust, a control member carried in said body and slidably movable between two limiting positions adjacent said spaced valves, resilient means for urging said control member laterally toward said valves, means for controlling the compression of said resilient means, said control member having a substantially wedge shaped cam surface for contacting and moving one of said valves at each limiting position, and a spring pressed toggle linkage for moving said control member alternately to said limiting positions in timed relationship to the reciprocations of said motor.

7. A valve control device for a reciprocating fluid pressure motor which comprises, a valve body provided with an inlet bore for the reception of fluid under pressure, a pair of outlet bores for connection to opposite ends of a reciprocating fluid pressure motor, and an exhaust port, a double acting valve positioned in said body for reciprocally controlling connection between the inlet bore and one of said outlet bores and between the outlet bore and the exhaust, a second double acting valve spaced from said first mentioned valve for reciprocally controlling connection between the inlet bore and the outer outlet bore and between said last mentioned outlet bore and the exhaust, resilient pressure means positioned opposite each valve in spaced relationship to each valve, a control member carried in said body and slidably movable between two limiting positions between said pressure means and said valves, said control member having an arcuate cam surface for wedging between said resilient pressure means and one of said valves at each limiting position, and a spring-pressed toggle linkage for moving said control member alternately to said limiting positions in timed relationship to the reciprocations of said motor.

8. A valve control device for a reciprocating fluid pressure motor which comprises, a valve body provided with an inlet bore for the reception of fluid under pressure, an outlet bore for connection to a fluid motor, and an exhaust, a double acting valve positioned in said body for reciprocally controlling connection between the inlet bore and the outlet bore and between the outlet bore and the exhaust, resilient pressure means positioned opposite said valve in spaced relationship with respect thereto, a control member carried in said body and movable between said pressure means and said valve, said control member having a substantially wedge surface for wedging between said pressure means and said valve to control said valve, and a spring-pressed toggle linkage for moving said member between said pressure means and said valve in response to reciprocation of said motor.

References Cited in the file of this patent

UNITED STATES PATENTS

| | | |
|---|---|---|
| 2,607,324 | Mead | Aug. 19, 1952 |
| 2,670,719 | Anderson et al. | Mar. 2, 1954 |
| 2,675,787 | Kuehling | Apr. 20, 1954 |